United States Patent [19]

Itoi

[11] Patent Number: 5,455,683
[45] Date of Patent: Oct. 3, 1995

[54] METHOD FOR PREVENTING ERROR SPEADING WHILE RECORDING COMPRESSED IMAGE DATA

[75] Inventor: Satoshi Itoi, Tokyo, Japan

[73] Assignee: NEC Corporation, Japan

[21] Appl. No.: 126,997

[22] Filed: Sep. 24, 1993

[30] Foreign Application Priority Data

Sep. 25, 1992 [JP] Japan .................................. 4-256668

[51] Int. Cl.$^6$ ..................................................... H04N 5/92
[52] U.S. Cl. ............................................. 358/335; 360/32
[58] Field of Search ........................... 368/335, 310; 360/33.1, 32; 348/409, 384, 421, 420; H04N 5/92

[56] References Cited

U.S. PATENT DOCUMENTS 5,023,710  6/1991  Kondo et al. ............................ 358/335
5,032,927  7/1991  Watanabe et al. ....................... 358/335

Primary Examiner—Tommy P. Chin
Assistant Examiner—Huy Nguyen
Attorney, Agent, or Firm—Ostrolenk, Faber, Gerb & Soffen

[57] ABSTRACT

A method of recording a sequence of video blocks, each comprising a plurality of bytes, each representing compressed image data code, includes the step of recording a video block identification signal after recording a synchronization signal in each of a plurality sync blocks. Then video data codes are recorded adjacent the video block identification signal. This is followed by a connection code being recorded adjacent the video data codes in the video blocks. The video block identification signal recorded between the synchronization signal and the video data codes contains a coded combination of bits for defining the position of first bit or byte of a new video block in the video data area.

3 Claims, 3 Drawing Sheets

| VB ID 15 | VB ID 14 | VB ID 13 | VB ID 12 | VB ID 11 | VB ID 10 | VB ID 9 | VB ID 8 | VB ID 7 | VB ID 6 | VB ID 5 | VB ID 4 | VB ID 3 | VB ID 2 | VB ID 1 | VB ID 0 |
|---|---|---|---|---|---|---|---|---|---|---|---|---|---|---|---|

VBID15~VBID14  START SYMBOL NUMBERS OF NEW VBs IN EACH SB

| VBID15 | VBID14 |  |
|---|---|---|
| 0 | 0 | START FROM THE 0TH SYMBOL |
| 0 | 1 | START FROM THE 8TH SYMBOL |
| 1 | 0 | START FROM THE 16TH SYMBOL |
| 1 | 1 | START FROM THE 24TH SYMBOL |

VBID13~VBID0  INTERFIELD VB NUMBERS OF NEW VBs IN EACH SB

VBID13 • • • • VBID0
0 0 0 0 0 0 0 0 0 0 0 0 0 0   THE 0TH VIDEO BLOCK

VBID13 • • • • VBID0
1 1 0 0 1 0 1 1 1 1 1 1 1 1   THE 13055TH VIDEO BLOCK

FIG. 1

| SYNC (2 BYTES) | VBID (2 BYTES) | VIDEO DATA (176 BYTES) | C1 COR.CODE (16 BYTES) |

THE 18TH BYTE ├─────── NEW VIDEO BLOCK START

FIG. 2

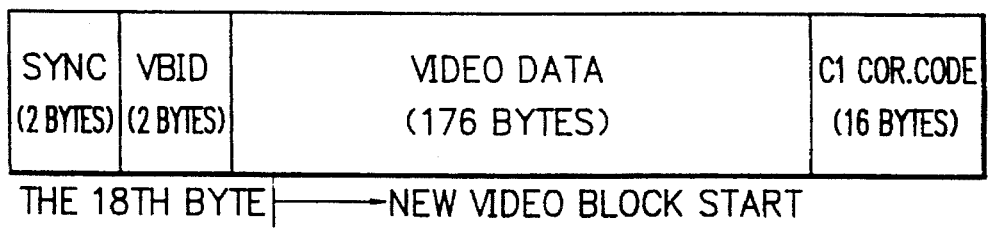

VBID15~VBID14  START SYMBOL NUMBERS OF NEW VBs IN EACH SB

VBID15 VBID14
     0   0    START FROM THE 0TH SYMBOL
     0   1    START FROM THE 8TH SYMBOL
     1   0    START FROM THE 16TH SYMBOL
     1   1    START FROM THE 24TH SYMBOL

VBID13~VBID0  INTERFIELD VB NUMBERS OF NEW VBs IN EACH SB

VBID13 ····· VBID0
   0 0 0 0 0 0 0 0 0 0 0 0 0 0  THE 0TH VIDEO BLOCK

VBID13 ····· VBID0
   1 1 0 0 1 0 1 1 1 1 1 1 1 1  THE 13055TH VIDEO BLOCK

FIG. 3

| SYNC (2 BYTES) | VBID (3 BYTES) | VIDEO DATA (175 BYTES) | C1 COR.CODE (16 BYTES) |

THE 11TH BYTE ├─────── NEW VIDEO BLOCK START

FIG. 4

| VB ID 23 | VB ID 22 | ---- | VB ID 16 | VB ID 15 | VB ID 14 | ---- | VB ID 8 | VB ID 7 | VB ID 6 | ---- | VB ID 1 | VB ID 0 |
|---|---|---|---|---|---|---|---|---|---|---|---|---|

VBID23  0: NEW VB EXISTS IN ITS SB  1: NO NEW VB EXISTS IN ITS SB

VBID22~VBID8 WHEN VBID23=0, INTERFRAME VB NUMBERS OF NEW VBs IN EACH SB

VBID22 · · · · · VBID8
  0 0 0 0 0 0 0 0 0 0 0 0 0 0 0  THE 0TH VIDEO BLOCK

VBID22 · · · · · VBID8
  1 1 0 0 1 0 1 1 1 1 1 1 1 1 1  THE 26111TH VIDEO BLOCK

WHEN VBID23=1 ALL "0"

VBID7~VBID0 WHEN VBID23=0, START SYMBOL NUMBERS OF NEW VBs IN EACH SB

VBID7 · · · · · VBID0
  0 0 0 0 0 0 0 0  START FROM THE 0TH SYMBOL

VBID7 · · · · · VBID0
  1 0 1 0 0 0 1 1  START FROM THE 174TH SYMBOL

WHEN VBID23=1, ALL "0"

FIG. 5

| SYNC (2 BYTES) | VBID (4 BYTES) | VIDEO DATA (174 BYTES) | C1 COR.CODE (16 BYTES) |
|---|---|---|---|

THE 9TH BYTE
THE 2ND BYTE   → NEW VIDEO BLOCK START

FIG. 6

| VB ID 31 | VB ID 30 | ---- | VB ID 24 | VB ID 23 | VB ID 22 | ---- | VB ID 16 | VB ID 15 | VB ID 14 | ---- | VB ID 8 | VB ID 7 | VB ID 6 | ---- | VB ID 1 | VB ID 0 |
|---|---|---|---|---|---|---|---|---|---|---|---|---|---|---|---|---|

VBID31      0: NEW VB EXISTS IN ITS SB    1: NO NEW VB EXISTS IN ITS SB

VBID30~VBID16    WHEN VBID31=0, INTERFRAME VB NUMBERS OF NEW VBs IN EACH SB

VBID30 ..... VBID16
    0 0 0 0 0 0 0 0 0 0 0 0 0 0 0    THE 0TH VIDEO BLOCK

VBID30 ..... VBID16
    1 1 0 0 1 0 1 1 1 1 1 1 1 1 1    THE 26111TH VIDEO BLOCK

WHEN VBID31=1, ALL "0"

VBID15~VBID8    WHEN VBID31=0, START SYMBOL NUMBERS OF NEW VBs IN EACH SB

VBID15 ..... VBID8
    0 0 0 0 0 0 0 0    START FROM THE 0TH SYMBOL

VBID15 ..... VBID8
    1 0 1 0 0 0 1 1    START FROM THE 173TH SYMBOL

WHEN VBID31=1 ALL "0"

VBID7~VBID5    WHEN VBID31=0, START SYMBOL NUMBERS OF NEW VBs IN EACH SB

VBID7 VBID6 VBID5
      0    0    0    START FROM THE 0TH BIT

VBID7 VBID6 VBID5
      1    1    1    START FROM THE 7TH BIT

WHEN VBID31=1, ALL "0"

VBID4~VBID0    MODE INFORMATION, TABLE INFORMATION, MAP INFORMATION

1

METHOD FOR PREVENTING ERROR SPEADING WHILE RECORDING COMPRESSED IMAGE DATA

BACKGROUND OF THE INVENTION

The present invention relates to a recording system of compressed image data in a recording apparatus such as a digital video tape recorder (VTR), a digital image recording optical disk apparatus or the like.

DESCRIPTION OF THE RELATED ARTS

In recording of compressed image data in a digital VTR, a digital image recording optical disk apparatus or the like, a DCT (discrete cosine transform) technique wherein 8 pixels×8 lines constitute one video block is often used as a compression system. In this case, after the DCT process is performed, a suitable bit number is assigned to each video block to carry out a control operation so as to settle the data within a bit number which has been determined by one field unit or one frame unit. Further, in the digital recording apparatus, the video data are divided into blocks at each predetermined bit number. A synchronizing signal is added to each block and then each block and synchronizing signal are recorded as sync block.

In this conventional recording system, the data position in each sync block, that is, the position on a tape or disk does not correspond to the position on the video block, that is, the position on a screen. For example, when an uncorrectable error occurs in mode data representing the data amount of the video block while a search is executed in the VTR or the like, or when an editing process is performed, the error occurring at one portion may spread in one field or one frame.

In such a case, since the data amount of one video block is varied when recording the compressed image data on the tape or disk, the error occurring at one portion should be prevented from the spreading to the neighboring video blocks.

SUMMARY OF THE INVENTION

Accordingly, it is an object of the present invention to provide a compressed image data recording system, free from the aforementioned defects of the prior art, which is capable of preventing an error from spreading beyond one sync block when an uncorrectable error occurs, when a search is executed in a VTR or when an editing is carried out, so as to obtain a reproduction image of high quality.

According to the present invention, a video block identification signal is inserted or recorded after a synchronization signal in each sync block, and by showing a presence and absence of a new video block or blocks, head positions of video blocks, byte numbers, bit numbers and their video block numbers, a compression mode and the like in the sync block, when an uncorrectable error occurs while performing a search in a VTR or the like, or when an editing process is performed, an error spreading beyond one sync block can be prevented as much as possible to obtain a reproduction image of high quality.

In accordance with one aspect of the present invention, there is provided a method of recording compressed image data, in which image signals are divided into several tens of thousands of video blocks and a suitable bit number is assigned to each video block to record compressed image data controlled so as to be settled in a bit number determined by either one field unit or one frame unit, comprising the steps of: determining a byte number of each video block to be equal to 8 n (n≧1) bytes so as to control video data to a fixed byte number by either one field unit or one frame unit; determining a minimum unit in a data recording to a sync block; inserting a video block identification signal after a synchronization signal in each sync block by using the fact that each new video block in each sync block starts from 8(n−1)th bytes; and recording a presence and absence of the new video block, a head position of the video block and its video block number, and a compression mode in the sync block.

In accordance with another aspect of the present invention, there is provided a method of recording compressed image data, in which image signals are divided into several tens of thousands of video blocks and a suitable bit number is assigned to each video block to record compressed image data controlled so as to be settled in a bit number predetermined by either one field unit or one frame unit, comprising the steps of: determining a bit number of one video block to a value divisible by a byte unit so as to control video data to a fixed byte number by either one field unit or one frame unit; determining a minimum unit in a data recording to a sync block; inserting a video block identification signal after a synchronization signal in each sync block by using the fact that each new video block in each sync block starts from a head of any of the byte numbers; and recording a presence and absence of the new video block, a head byte number of the video block and its video block number, and a compression mode in the sync block.

In accordance with a further aspect of the present invention, there is provided a method of recording compressed image data, in which image signals are divided into several tens of thousands of video blocks and a suitable bit number is assigned to each video block to record compressed image data controlled so as to be settled in a bit number predetermined by either one field unit or one frame unit, comprising the steps of: determining a bit number of one video block to an unfixed value so as to control video data to a fixed byte number by either one field unit or one frame unit; determining a minimum unit in a data recording to a sync block; inserting a video block identification signal after a synchronization signal in each sync block by using the fact that each new video block in each sync block starts from any of the byte numbers and any of the bit numbers; and recording a presence and absence of the new video block, a head byte number of the video block, a bit number and its video block number, and a compression mode in the sync block.

BRIEF DESCRIPTION OF THE DRAWINGS

The objects, features and advantages of the present invention will become more apparent from the consideration of the following detailed description taken in conjunction with the accompanying drawings in which:

FIG. 1 is a schematic view showing a sync block format used in a first embodiment of a compressed image data recording system according to the invention;

FIG. 2 is a diagram showing recorded contents of a video block identification signal used in the first embodiment of the present invention;

FIG. 3 is a schematic view showing a sync block format used in a second embodiment of a compressed image data recording system according to the invention;

FIG. 4 is a diagram showing recorded contents of a video block identification signal used in the second embodiment of the present invention;

FIG. 5 is a schematic view showing a sync block format used in a third embodiment of a compressed image data recording system according to the invention; and FIG. 6 is a diagram showing recorded contents of a video block identification signal used in the third embodiment of the present invention.

DESCRIPTION OF THE PREFERRED EMBODIMENTS

Referring now to the drawings, wherein like reference characters designate like or corresponding parts throughout the views and thus the repeated description thereof can be omitted for brevity, there is shown in FIGS. 1 and 2 the first embodiment of the present invention.

FIG. 1 shows a first embodiment of a sync block format created according to the first embodiment of the recording method of the present invention. As shown in FIG. 1, one sync block as recorded according to the first embodiment of the recording method is comprised of a synchronization signal SYNC of 2 bytes, a video block identification signal VBID of 2 bytes, video data of 176 bytes and a C1 correction code of 16 bytes. The byte number of the video data must be divisible by 8. For example, in the case of hi-vision image data, one field is composed of 13056 video blocks. One block is comprised of any of 8 bytes, 16 bytes, 24 bytes and 32 bytes, to 8 n bytes, where n is an integer greater than or equal to 1, and the video data are controlled to a predetermined byte number in one field unit. That is, a new video block in each sync block starts from any of the zero byte, the eighth byte, the sixteenth byte and the twenty-fourth byte, etc.

FIG. 2 illustrates recorded contents of the 2-byte video block identification signal VBID. As shown in FIG. 2, the start positions of the new video hocks (VBs) in each sync block (SB) are shown in VBID15 and VBID14. When starting from the zero byte, the eighth byte, the sixteenth byte and the twenty-fourth byte, values of 00, 01, 10 and 11 are given, respectively. VBID13 to VBID0 are video block numbers and show 0 to 13055.

Now, it is assumed that data "10-00000001000000" are recorded in VBID15 to VBID0 of a certain sync block. Usually, data from the previous sync block are finished in the fifteenth byte. For example, now, it is assumed that an uncorrectable error occurs in the system and it is determined that the data of the previous sync block are finished in the seventh byte. At this time, because there is no VBID signal, it is considered that the new data starts from the eighth byte and a decoding procedure is continuously executed. Hence, the breakpoint of the video blocks is shifted and the error may spread in one field. However, in this embodiment, since there is the VBID signal, the first video block of this sync block normally starts from the sixteenth byte and it is determined that its video block number is 64. As a result, the error spreading can be prevented. In this embodiment, as described above, by using the VBID signal, the error spreading beyond one sync block can be largely reduced.

In this embodiment, although the data amount control within the field has been performed, the same method can be used for data control within the frame. Further, as to the start positions of the new video blocks and the video block numbers in each sync block, the recording positions can be replaced with each other. Furthermore, the presence and absence of the new video blocks, the compression mode and the like in the sync block can be recorded as needed. In this case, according to circumstances, it is necessary to increase the VBID signal to 3 bytes.

In FIGS. 3 and 4, there is shown the second embodiment of the present invention.

FIG. 3 shows a second embodiment of a sync block format created using a recording method of a second embodiment of the invention. In FIG. 3, one sync block as recorded using the recording method of the second embodiment is comprised of a synchronization signal SYNC of 2 bytes, a video block identification signal VBID of 3 bytes, video data of 175 bytes and a C1 correction code of 16 bytes. Taking the case of the hi-vision image data, one frame is composed of 26112 video blocks and the bit number of one block is determined so as to be divisible by one byte or 8 bits.

FIG. 4 illustrates recorded contents of the 3-byte video block identification signal VBID. In FIG. 4, VBID23 indicates the presence and absence of the new video block or blocks in the sync block. When there is the new video block or blocks in the sync block, '0' is given to VBID23 and when there is no new video block, '1' is given. Further, VBID22 to VBID8 show video block numbers of 0 to 26111. Moreover, VBID7 to VBID0 indicate the start numbers such as 0 to 174 of the new video blocks in each sync block.

Now, it is assumed that data "0-000000011000000001011" are recorded in VBID15 to VBID0 of a certain sync block. Usually, data from the previous sync block are finished in the tenth byte. For example, now, it is assumed that an uncorrectable error occurs in the system and it is determined that the data of the previous sync block are finished in the eighth byte. At this time, because there is no VBID signal, it is considered that the new data starts from the ninth byte and the decoding procedure is continuously executed. Hence, the breakpoint of the video blocks is shifted and the error may spread in one frame. However, in this embodiment, since there is the VBID signal, the first video block of this sync block normally starts from the eleventh byte and it is determined that its video block number is 96. As a result, the error spreading can be prevented. In this embodiment, as described above, by using the VBID signal, the error spreading beyond one sync block can be largely reduced.

In this embodiment, although the data amount control within the frame has been performed, the same method can be used for data control within the field. Further, relating to the presence and absence of the new video blocks in the sync blocks and the video block numbers of the new video blocks and the start byte numbers in each sync block, the recording positions can be replaced with each other. Moreover, the compression mode and the like in the sync block can be recorded as needed. In this case, according to circumstances, it is necessary to increase the VBID signal to 4 bytes.

In FIGS. 5 and 6, there is shown the third embodiment of the present invention.

FIG. 5 shows a third embodiment of a sync block format created using a third embodiment of the recording method. In FIG. 5, one sync block recorded using the recording method of the third embodiment is comprised of a synchronization signal SYNC of 2 bytes, a video block identification signal VBID of 4 bytes, video data of 174 bytes and a C1 correction code of 16 bytes. Taking the case of the hi-vision image data, one frame is composed of 26112 video blocks and the bit number of one block is determined to be completely unfixed or variable.

FIG. 6 illustrates recorded contents of the 4-byte video block identification signal VBID. In FIG. 6, VBID31 indicates the presence and absence of the new video block or blocks in the sync block. When there is the new video block or blocks in the sync block, '0' is given to VBID31 and when there is no new video block, '1' is given. Further, VBID30 to VBID16 show video block numbers of 0 to 26111. Moreover, VBID15 to VBID8 indicate the start byte numbers such as 0 to 173 of the new video blocks in each sync block and VBID7 to VBID5 show start bit numbers such as 0 to 7 of the video blocks of each sync block. In VBID4 to VBID0, mode information, table information, map information and the like of the compression mode can be recorded.

Now, it is assumed that data "0-000000010000000000001001-01000000" are recorded in VBID31 to VBID0 of a certain sync block. Data from the previous sync block are usually finished in the ninth byte and the first bit. Now, for example, it is assumed that an uncorrectable error occurs in the system and it is determined that the data of the previous sync block are finished in the twelfth byte and the sixth bit. At this time because there is no VBID signal, it is considered that the new data starts from the twelfth byte and the seventh bit and the decoding is continuously executed. Hence, the breakpoint of the video blocks is shifted and the error may spread in one frame. However, in this embodiment, since there is the VBID signal, the first video block of this sync block normally starts from the ninth byte and the second bit and it is determined that its video block number is 128. As a result, the error spreading can be prevented. In this embodiment, as described above, by using the VBID signal, the error spreading beyond one sync block can be largely reduced.

In this embodiment, although the data amount control within the frame has been performed, the same method can be used for data control within the field. Further, concerning the presence and absence of the new video block or blocks in the sync blocks and the new video block numbers, the start byte numbers, the start bit numbers, the compression mode and the like in each sync block, the recording positions can be replaced with each other.

According to the present invention, as described above, the video block identification signal is inserted after the synchronization signal in each sync block, and the presence and absence of the new video block or blocks, the head positions of the video blocks, the byte numbers, the bit numbers and their video block numbers, the compression mode and the like in the sync block are shown. Hence, when the uncorrectable error occurs, when the search is carried out in the VTR or the like, or when the editing is performed, the error spreading beyond one sync block can be prevented as much as possible to obtain the reproduction image of high quality.

While the present invention has been described with reference to the particular illustrative embodiment, it is not to be restricted by those embodiment but only by the appended claims. It is to be appreciated that those skilled in the art can change or modify the embodiment without departing from the scope and spirit of the present invention.

What is claimed is:

1. A method for recording a sequence of video blocks, each of the video blocks comprising 8n bytes, where n is an integer greater than or equal to 1, each of the bytes representing a compressed video data code, the sequence of video blocks being recorded in a field divided into a predetermined number of sync blocks each for recording a synchronous signal of sync block, a predetermined number of video data codes in continuous video blocks in the sequence of video blocks, a set of correction codes to be read to correct the video data codes recorded in the sync block, and an information signal to be read to control a starting one of the continuous video blocks in the sync block, the method comprising the steps of:

recording the synchronous signal in a first area of the sync block;

recording the information signal in a second area adjacent to the first area in the sync block, the information signal including information regarding a starting position in the sync block of an 8(n−1)-th byte of the starting video block;

recording the predetermined number of video data codes in a third area adjacent to the second area in the sync block; and recording the correction codes in a fourth area adjacent to the third area in the sync block.

2. A method for recording a sequence of video blocks, each of the video block comprising n bytes, where n is an integer greater than or equal to 1, each of the bytes representing a compressed video data code, the sequence of video blocks being recorded in a field divided into a predetermined number of sync blocks each for recording a synchronous signal of the sync block, a predetermined number of video data codes in continuous video blocks in the sequence of video blocks, a set of correction codes to be read to correct the video data codes recorded in the sync block, and an information signal to be read to control a starting one of the continuous video blocks in the sync block, the method comprising the steps of:

recording the synchronous signal in a first area in the sync block;

recording the information signal in a second area adjacent to the first area in the sync block, the information signal including information regarding a presence or absence of the starting video block in the sync block and information regarding a starting position in the starting video block of a heading byte with respect to a starting position in the sync block of the heading byte;

recording the predetermined number of video data codes in a third area adjacent to the second area in the sync block; and recording the correction codes in a fourth area adjacent to the third area in the sync block.

3. A method for recording a sequence of video blocks, each of the video blocks comprising n bits, where n is an integer equal to or greater than 1, each of the bits representing a compressed video data code, the sequence of video blocks being recorded in a field divided into a predetermined number of sync blocks each for recording a synchronous signal of the sync block, a predetermined number of video data codes in continuous video blocks in the sequence of video blocks, a set of correction codes to be read to correct the video data codes recorded in the sync block, and an information signal to be read to control a starting one of the continuous video blocks in the sync block, the method comprising the steps of:

recording the synchronous signal in a first area in the sync block;

recording the information signal in a second area adjacent to the first area in the sync block, the information signal including information regarding a presence or absence of the starting video block in the sync block and information regarding a starting position within the sync block of a heading bit with respect to a starting position in the starting video block of the heading bit;

recording the predetermined number of video data codes in a third area adjacent to the second area in the sync block; and recording the correction codes in a fourth area adjacent to the third area in the sync block.

* * * * *